(12) United States Patent
Bando

(10) Patent No.: US 10,919,795 B2
(45) Date of Patent: Feb. 16, 2021

(54) GLASS PLATE BEND-BREAKING MACHINE

(71) Applicant: BANDO KIKO CO., LTD., Tokushima (JP)

(72) Inventor: Kazuaki Bando, Tokushima (JP)

(73) Assignee: BANDO KIKO CO., LTD., Tokushima (JP)

( * ) Notice: Subject to any disclaimer, the term of this patent is extended or adjusted under 35 U.S.C. 154(b) by 0 days.

(21) Appl. No.: 16/333,792

(22) PCT Filed: Sep. 26, 2018

(86) PCT No.: PCT/JP2018/035819
§ 371 (c)(1),
(2) Date: Mar. 15, 2019

(87) PCT Pub. No.: WO2019/082585
PCT Pub. Date: May 2, 2019

(65) Prior Publication Data
US 2019/0256397 A1    Aug. 22, 2019

(30) Foreign Application Priority Data
Oct. 25, 2017   (JP) .................................. 2017-206690

(51) Int. Cl.
*C03B 33/033*        (2006.01)
*C03B 33/03*         (2006.01)
(Continued)

(52) U.S. Cl.
CPC .............. *C03B 33/033* (2013.01); *B26F 3/00* (2013.01); *B26F 3/002* (2013.01); *B28D 5/00* (2013.01);
(Continued)

(58) Field of Classification Search
CPC ........ C03B 33/03; C03B 33/033; C03B 33/04; B26F 3/002
See application file for complete search history.

(56) References Cited

U.S. PATENT DOCUMENTS 2,078,386 A  *  4/1937  Kendis ................. C03B 33/027
                                                  33/32.6
3,216,635 A  *  11/1965  Lefevre ................ C03B 33/027
                                                  225/96.5
(Continued)

FOREIGN PATENT DOCUMENTS

CN          1269770 A        10/2000
CN        105365060 A         3/2016
(Continued)

OTHER PUBLICATIONS

Taiwanese Office Action dated Feb. 27, 2019 in Taiwanese Application No. 107127043, with Summarized English Translation, 10 pages.

(Continued)

*Primary Examiner* — Kenneth E Peterson
(74) *Attorney, Agent, or Firm* — Nixon & Vanderhye P.C.

(57) ABSTRACT

A glass plate bend-breaking machine includes a flexible endless belt on which a glass plate is placed; a supporting mechanism for supporting the glass plate through the endless belt; a glass plate receiving device disposed below the endless belt and having a glass plate receiving surface for receiving the glass plate through the endless belt and a recess surrounded by the glass plate receiving surface; a moving device for moving the glass plate receiving surface of the glass plate receiving device; a press-breaking device disposed above the endless belt and having a pressing surface for press-breaking the glass plate; and a moving device for moving the pressing surface of the press-breaking device.

6 Claims, 9 Drawing Sheets

(51) Int. Cl.
  *C03B 33/04* (2006.01)
  *B28D 5/00* (2006.01)
  *B26F 3/00* (2006.01)
  *B28D 7/04* (2006.01)
(52) U.S. Cl.
  CPC ............... *B28D 7/04* (2013.01); *C03B 33/03* (2013.01); *C03B 33/04* (2013.01)

(56) References Cited

U.S. PATENT DOCUMENTS

| 6,218,793 | B1 | 4/2001 | Bando |
| 10,035,724 | B2 * | 7/2018 | Cleary ................. C03B 33/033 |
| 2006/0081673 | A1 | 4/2006 | Schenk et al. |

FOREIGN PATENT DOCUMENTS

| DE | 698 27 029 T2 | 3/2006 |
| EP | 1 031 541 A1 | 8/2000 |
| ES | 2 232 010 T3 | 5/2005 |
| JP | 5-221673 A | 8/1993 |
| JP | 8-217475 A | 8/1996 |
| JP | 11-116261 A | 4/1999 |
| JP | 2006-117518 A | 5/2006 |
| JP | 2012-71365 A | 4/2012 |
| JP | 2013-043348 * | 3/2013 | ............... B28D 5/00 |
| JP | 2014-55109 A | 3/2014 |
| JP | 2016-40079 A | 3/2016 |
| KR | 10-2016-0019849 A | 2/2016 |
| TW | 201605749 A | 2/2016 |
| WO | WO 00/12439 A1 | 3/2000 |

OTHER PUBLICATIONS

Notice of Reasons for Rejection dated Jun. 27, 2019 in Korean Application No. 10-2019-7007545, with summarized English translation, 7 pages.

Taiwanese Office Action dated May 16, 2019 in Taiwanese Application No. 107136703, with summarized English translation, 5 pages.

International Search Report dated Nov. 27, 2018 in International Application No. PCT/JP2018/035819, 4 pages).

* cited by examiner

GLASS PLATE BEND-BREAKING MACHINE

CROSS REFERENCE TO RELATED APPLICATIONS

This application is the U.S. national phase of International Application No. PCT/JP2018/035819 filed Sep. 26, 2018 which designated the U.S. and claims priority to Japanese Application No. 2017-206690 filed Oct. 25, 2017, the entire contents of each of which are hereby incorporated by reference.

TECHNICAL FIELD

The present invention relates to a machine for bend-breaking a glass plate.

BACKGROUND ART

Glass plate bend-breaking machines are known in which a press-breaking device is moved within a plane, which is parallel to the surface of a glass plate placed on an endless belt, and along a bend-breaking line formed on the glass plate, while a glass plate receiving device is moved below the endless belt in correspondence with the movement of the press-breaking device.

PRIOR ART DOCUMENT

Patent Document

[Patent Document 1] JP-A-1996-217475

SUMMARY OF THE INVENTION

Problems that the Invention is to Solve

In such a glass plate bend-breaking machine, at the time of press-breaking a glass plate along a cut line, generally, a glass plate receiving surface of a glass plate receiving device is disposed on the lower surface of the glass plate inside a region surrounded by a bend-breaking line, and a push rod is pressed, outside the region surrounded by the bend-breaking line, against the upper surface of the glass plate whose lower surface is supported by the glass plate receiving surface disposed inside such a region, thereby bend-breaking the glass plate by press-breaking the glass plate along the bend-breaking line. Therefore, at the time when, after press-breaking, the glass plate receiving surface is moved to an ensuing press-breaking position, there are cases where bend-broken cullet after press-breaking is pushed up by the glass plate receiving surface, and when such pushing up of the bend-broken cullet occurs, that bend-broken cullet can collide against a bend-broken surface of the glass plate as a product after press-breaking, thereby possibly causing chipping or the like of the glass plate as a product at the bend-broken surface.

The present invention has been devised in view of the above-described aspects, and its object is to provide a glass plate bend-breaking machine which does not cause chipping or the like on the bend-broken surface of the glass plate as a product after press-breaking.

Means for Solving the Problems

A machine for bend-breaking a glass plate in accordance with the present invention is comprised of: a flexible member on which the glass plate with a cut line formed thereon is placed; a supporting mechanism for supporting the glass plate from a lower side of the glass plate through the flexible member; a glass plate receiving device having an annular glass plate receiving surface for receiving the glass plate from the lower side of the glass plate through the flexible member and a recess surrounded by the annular glass plate receiving surface; a first moving device for moving the glass plate receiving surface of the glass plate receiving device; a press-breaking device for press-breaking the glass plate along the cut line by pressing the glass plate from an upper side of the glass plate; and a second moving device for moving the press-breaking device, the second moving device being adapted to dispose the press-breaking device such that, at the time of press-breaking of the glass plate by the press-breaking device, the press-breaking device can press that part of the glass plate that opposes the recess surrounded by the glass plate receiving surface which is moved by the first moving device, and the press-breaking device is adapted to press-break the glass plate along the cut line by pressing against that part of the glass plate that opposes the recess surrounded by the glass plate receiving surface.

According to such a glass plate bend-breaking machine in accordance with the present invention, the glass plate receiving device has an annular glass plate receiving surface and a recess surrounded by this annular glass plate receiving surface, the first moving device is adapted to move the glass plate receiving surface, and the second moving device for moving the press-breaking device is adapted to dispose the press-breaking device such that, at the time of press-breaking of the glass plate by the press-breaking device, the press-breaking device can press that part of the glass plate that opposes the recess surrounded by the glass plate receiving surface which is moved by the first moving device. As a result, even if the glass plate receiving surface is disposed outside the region and contiguously to the region, or outside the region and away from the region, and even if a portion of the glass plate receiving surface is disposed inside the region and a remaining portion is disposed outside the region, bend-breaking can be caused in the glass plate along the cut line owing to the deflection of the glass plate at the recess. Thus, it is possible to avoid collision between the bend-broken cullet and the bend-broken face of the glass plate as a product after press-breaking and eliminate the occurrence of chips or the like at the bend-broken face of the glass plate as a product after press-breaking.

More specifically, the glass plate bend-breaking machine in accordance with the present invention is comprised of: a flexible member on which the glass plate with a cut line formed thereon is placed; a supporting mechanism having a supporting surface for supporting through the flexible member the glass plate at a central portion of a lower surface of the glass plate in a region surrounded by the cut line on the glass plate in a plan view; a glass plate receiving device disposed below the flexible member and having an annular glass plate receiving surface for receiving the glass plate from a lower side of the glass plate through the flexible member and a recess surrounded by the annular glass plate receiving surface; a first moving device for moving the glass plate receiving surface of the glass plate receiving device; a press-breaking device disposed above the flexible member and having a pressing surface for press-breaking along a cut line the glass plate with the cut line formed thereon; and a second moving device for moving the pressing surface of the press-breaking device, the first moving device being adapted to dispose the glass plate receiving surface such that, at the time of press-breaking of the glass plate by the pressing surface, the pressing surface of the press-breaking device can press that part of the glass plate that opposes the recess surrounded by the glass plate receiving surface, the second moving device is adapted to dispose the pressing surface such that, at the time of press-breaking of the glass plate by the pressing surface, the pressing surface can press that part of the glass plate that opposes the recess surrounded by the glass plate receiving surface which has been moved by the first moving device, and the press-breaking device is adapted to press-break the glass plate along the cut line by causing the pressing surface to press against that part of the glass plate that opposes the recess surrounded by the glass plate receiving surface.

According to such a more specific glass plate bend-breaking machine in accordance with the present invention, the glass plate receiving device has an annular glass plate receiving surface and a recess surrounded by this annular glass plate receiving surface, and the first moving device is adapted to move the glass plate receiving surface such that, at the time of press-breaking of the glass plate by the pressing surface, the pressing surface of the press-breaking device can press that part of the glass plate that opposes the recess surrounded by the glass plate receiving surface. Moreover, the second moving device is adapted to move the pressing surface such that, at the time of press-breaking of the glass plate by the pressing surface, the pressing surface is pressed against that part of the glass plate that opposes the recess surrounded by the glass plate receiving surface which has been moved by the first moving device. As a result, even if the glass plate receiving surface is disposed outside the region and contiguously to the region, or outside the region and away from the region, and even if a portion of the glass plate receiving surface is disposed inside the region and a remaining portion is disposed outside the region, bend-breaking can be caused in the glass plate along the cut line owing to the deflection of the glass plate at the recess. Thus, it is possible to avoid collision between the bend-broken cullet and the bend-broken face of the glass plate as a product after press-breaking and eliminate the occurrence of chips or the like at the bend-broken face of the glass plate as a product after press-breaking.

In a preferred example according to the present invention, in the press-breaking of the glass plate along the cut line by the pressing surface of the press-breaking device, the annular glass plate receiving surface is positioned on the same plane as that of the supporting surface of the supporting mechanism, below the supporting surface of the supporting mechanism, or above the supporting surface of the supporting mechanism, or in a preferred example on the same plane as that of the supporting surface of the supporting mechanism, the glass plate receiving surface is circularly annular, and the recess is defined by a partial concave spherical surface.

In the present invention, in another preferred example, the first moving device includes a moving mechanism for moving the glass plate receiving surface in one direction and in another direction intersecting the one direction, within a plane which is parallel to the surface of the glass plate, and the second moving device includes a moving mechanism for moving the pressing surface in one direction and in another direction intersecting the one direction, within a plane which is parallel to the surface of the glass plate.

In still another example of the present invention, the flexible member has an endless belt, the machine for bend-breaking a glass plate further comprising a means for imparting tension to the endless belt and a traveling means for causing the endless belt to travel.

In the present invention, the glass plate receiving surface in a preferred example has a flat surface for receiving the lower surface of the glass plate through the flexible member, in connection with a cutter wheel in the formation of cut lines including an end cut line, and such a flat surface may be annular, or preferably circularly annular, and such a flat surface may be circular in its inner shape and circular in its outer shape.

Meanwhile, in the present invention, the pressing surface in a preferred example has a flat surface which makes it possible to press the upper surface of the glass plate. Preferably, the flat surface of such a pressing surface is sufficiently smaller than the open surface of the recess, and, for example, in a case where the outer shape of the flat surface of the pressing surface is circular, the glass plate receiving surface is annular, and the open surface of the recess defined by such a glass plate receiving surface is circular, the flat surface of the pressing surface has a diameter which is sufficiently smaller than the inside diameter of the glass plate receiving surface, i.e., the diameter of the open surface of the recess. Furthermore, in another preferred example, the pressing surface has a nonrotatable or rotatable partially cylindrical surface or cylindrical surface constituted by an outer peripheral surface of a partially cylindrical body or a cylindrical body. In still another preferred example, the pressing surface has a nonrotatable or rotatable partial spherical surface or spherical surface constituted by an outer peripheral surface of a partial sphere or a sphere. In addition, the pressing surface may be a conical surface or a truncated conical surface constituted by an outer peripheral surface of a conical body or a truncated conical body. Furthermore, the pressing surface may be a flat rectangular planar surface constituted by an outer peripheral surface of an end of a prismatic body instead of a flat circular planar surface. In the case where the recess is defined by a partial concave spherical surface, the partial cylindrical surface or the cylindrical surface, or the partial spherical surface or the spherical surface, of such a pressing surface preferably has a radius of curvature which is smaller than the radius of curvature of the partial concave spherical surface.

As glass plates to be bend-broken by the bend-breaking machine of the present invention, it is possible to cite, by way of example, window glass plates for general structures, glass plates for furniture, and glass plates for automobiles, such as front glass, rear glass, and side glass, as well as glass plates for display screens in such as computers and mobile phones, but other glass plates can be also included.

As the flexible member in the present invention, a flexible endless belt, which is a flexible endless member, can be cited as a preferred example, but a flexible ended sheet may be alternatively used.

Advantages of the Invention

According to the present invention, it is possible to provide a glass plate bend-breaking machine which does not cause chipping or the like on the bend-broken surface of the glass plate as a product after press-breaking.

MODE FOR CARRYING OUT THE INVENTION

Figure 1:
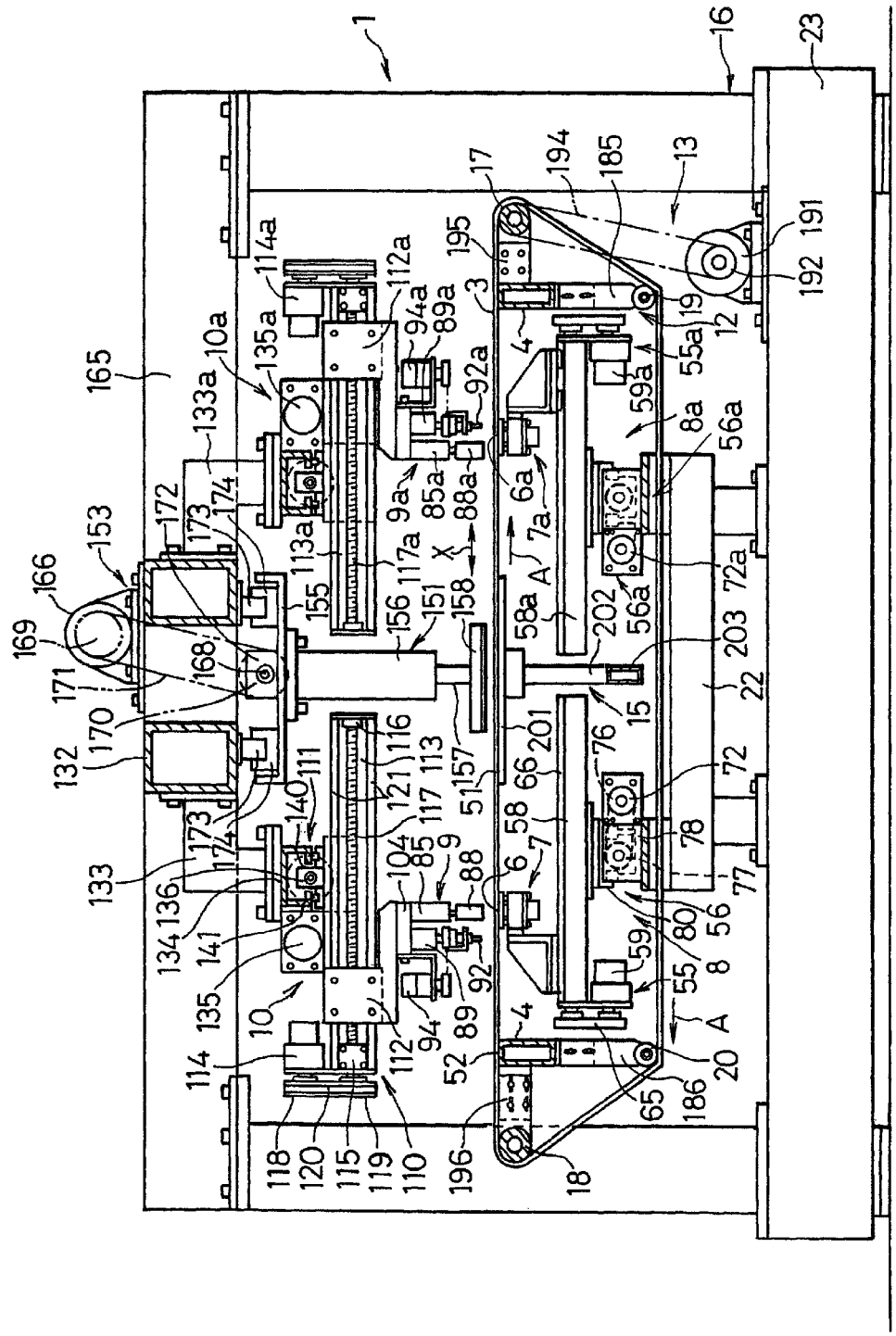
FIG. 1 is an explanatory side elevational view of a preferred embodiment of the present invention.
Figure 2:
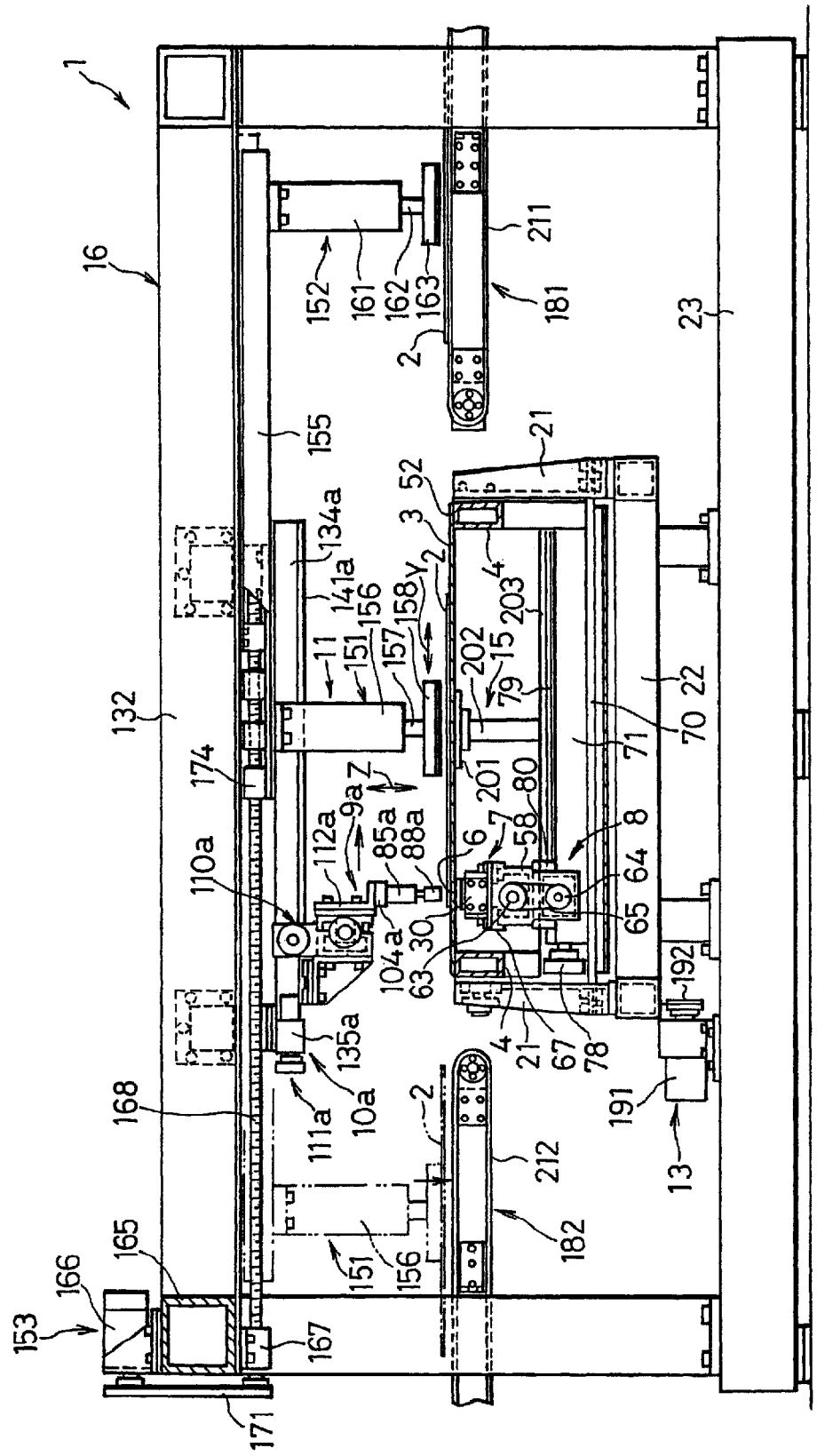
FIG. 2 is an explanatory front elevational view of the embodiment shown in FIG. 1.
Figure 3:
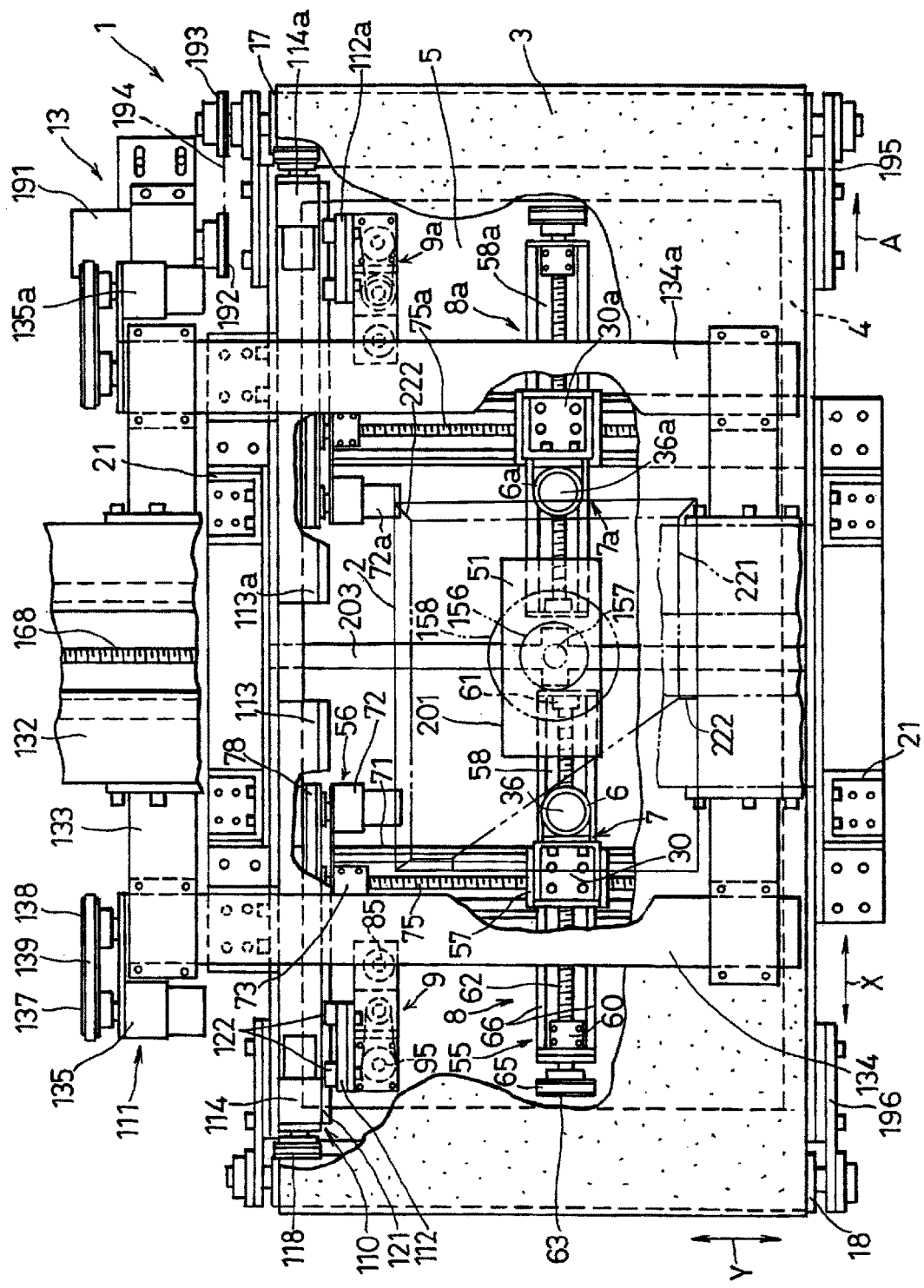
FIG. 3 is an explanatory plan view in which an endless belt, a supporting member, and the like are partly broken away in the embodiment shown in FIG. 1.
Figure 4:
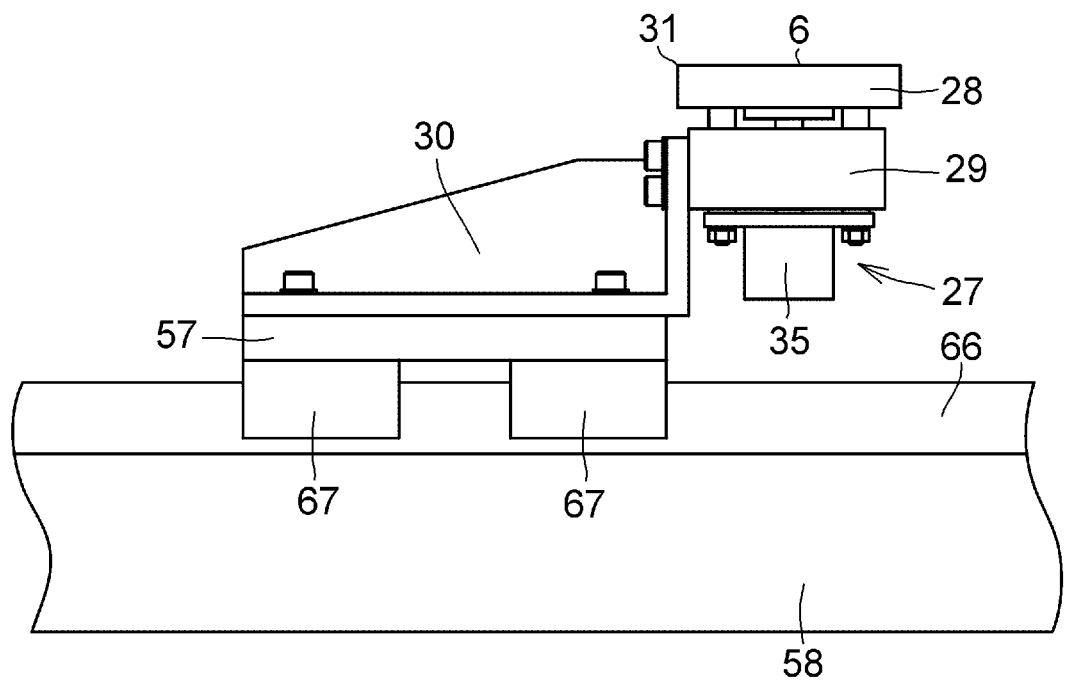
FIG. 4 is an explanatory detailed side elevational view of a glass plate receiving device in the embodiment shown in FIG. 1.
Figure 5:
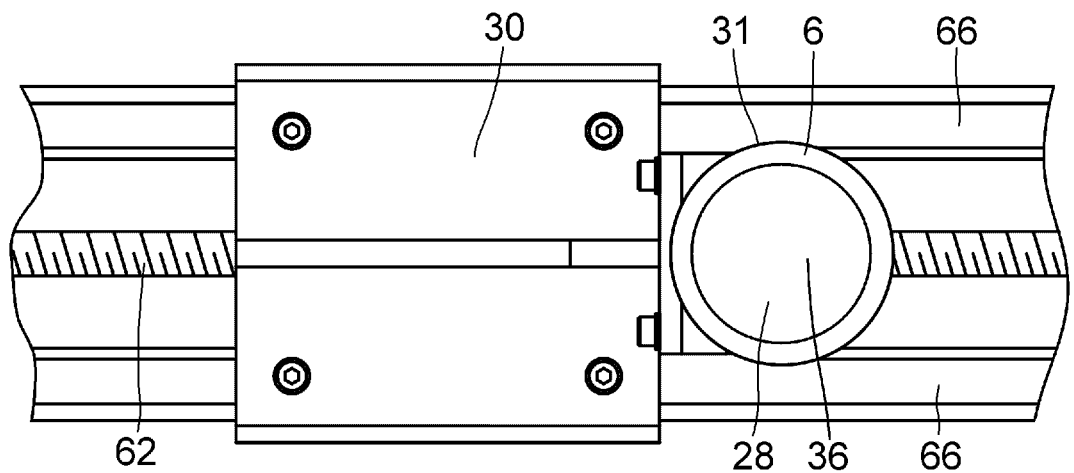
FIG. 5 is an explanatory detailed plan view of the glass plate receiving device in the embodiment shown in FIG. 1.
Figure 6:
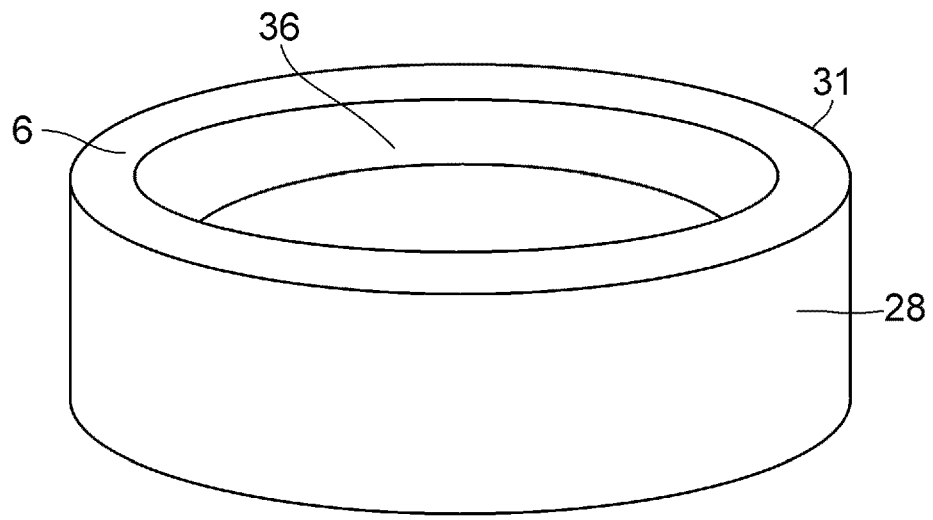
FIG. 6 is an explanatory perspective view of a glass plate receiving member in the embodiment shown in FIG. 1.

Hereafter, a more detailed description will be given of the present invention with reference to the embodiment shown in the drawings. The above-described aspects and other aspects of the present invention will become apparent therefrom. It should be noted that the present invention is not limited to the embodiment.

In FIGS. 1 to 7, a glass plate bend-breaking machine 1 in accordance with this embodiment is comprised of: a flexible endless belt 3 serving as a flexible member on which a glass plate 2 is placed; a supporting member 4 for supporting a peripheral portion of an upper side portion of the endless belt 3 from its lower surface side; a plurality of, in this embodiment two, glass plate receiving devices 7 and 7a which respectively have circularly annular glass plate receiving surfaces 6 and 6a for receiving the glass plate 2 from a lower surface side of the glass plate 2 through the endless belt 3 inside a region 5 surrounded by the supporting member 4, and which are disposed below the upper side portion of the endless belt 3; moving devices 8 and 8a for moving the glass plate receiving devices 7 and 7a respectively having the glass plate receiving surfaces 6 and 6a in an X direction, which is one direction within a plane parallel to the surface of the glass plate 2, i.e., within a horizontal plane in this embodiment, and in another direction perpendicular to the X direction, i.e., in a Y direction perpendicular to the X direction in this embodiment; a plurality of, in this embodiment two, press-breaking devices 9 and 9a disposed above the upper side portion of the endless belt 3; moving devices 10 and 10a for respectively moving the press-breaking devices 9 and 9a in the X direction, which is one direction within the horizontal plane and in another direction perpendicular to the X direction, i.e., in the Y direction perpendicular to the X direction in this embodiment; a carrying-in and carrying-out means 11 for carrying the glass plate 2 to be subjected to bend-breaking into the region 5 surrounded by the supporting member 4, and for carrying the glass plate 2 subjected to bend-breaking out of the region 5 surrounded by the supporting member 4; a tension imparting means 12 for imparting tension to the endless belt 3; a traveling device 13 for causing the endless belt 3 to travel in an A direction in the X direction; a supporting mechanism 15 having an upper surface 51 serving as a supporting surface for supporting the glass plate 2 through the endless belt 3 at a central portion of the lower surface of the glass plate 2; and a frame 16.

Both glass plate receiving devices 7 and 7a, both moving devices 8 and 8a, both press-breaking devices 9 and 9a, and both moving devices 10 and 10a are respectively constructed identically, a description will be given below of only the glass plate receiving device 7, the moving device 8, the press-breaking device 9, and the moving device 10 except for especially necessary cases, and corresponding devices will be only illustrated by attaching a to the same reference numerals.

The endless belt 3 is trained around a driving drum 17, a driven drum 18, and freely rotating drums 19 and 20.

The supporting member 4 formed of a hollow rectangular member is supported by a base 23 of the frame 16 through a bracket 21 and an intermediate base 22 of the frame 16. The supporting member 4 may be formed of a plate-shaped member instead of the hollow rectangular member. In short, it suffices if the supporting member 4 is capable of supporting the upper side portion of the endless belt 3 from its lower surface side and of ensuring that the upper side portion of the endless belt 3 does not sag to an extremely degree. Therefore, the supporting member 4 may be omitted insofar as tension can be imparted to the endless belt 3 in a desired manner to ensure that the upper side portion of the endless belt 3 does not sag to an extremely degree. In addition, if the driving drum 17 and the driven drum 18 are provided as in this embodiment, the driving drum 17 and the driven drum 18 may be made to function as parts of the supporting member 4, and portions in the supporting member 4 which extend in parallel to the driving drum 17 and the driven drum 18 may be omitted.

The glass plate receiving device 7 includes a raising and lowering means 27 for the glass plate receiving surface 6, which, in the formation of predetermined bend-breaking lines 221 and end cut lines (auxiliary cut lines) 222, brings the glass plate receiving surface 6 into contact with the lower surface of the upper side portion of the endless belt 3, in other words, makes the glass plate receiving surface 6 flush with the upper surface 51, and which, in the press-breaking of the glass plate 2 along the predetermined bend-breaking lines 221 and the end cut lines 222 by the press-breaking device 9, raises or lowers the glass plate receiving surface 6 by 1 mm to 5 mm or thereabouts or lowers or raises the glass plate receiving surface 6 to its original position after the raising or lowering, as required depending on cases; a glass plate receiving member 28 on which the glass plate receiving surface 6 and a circular recess 36 surrounded by the glass plate receiving surface 6 are formed on one end surface thereof; a supporting member 29 on which the glass plate receiving member 28 is mounted so as to be vertically movable; and a base 30 on which the supporting member 29 is mounted. The raising and lowering means 27 has a cylinder unit 35 which is mounted on the supporting member 29 and has a piston rod which is movably passed through the supporting member 29 and is connected to the glass plate receiving member 28. The cylinder unit 35 may be constituted by an air cylinder or may be a hydraulic cylinder and is adapted to raise and lower the glass plate receiving member 28 by its operation through a piston rod.

Figure 9:
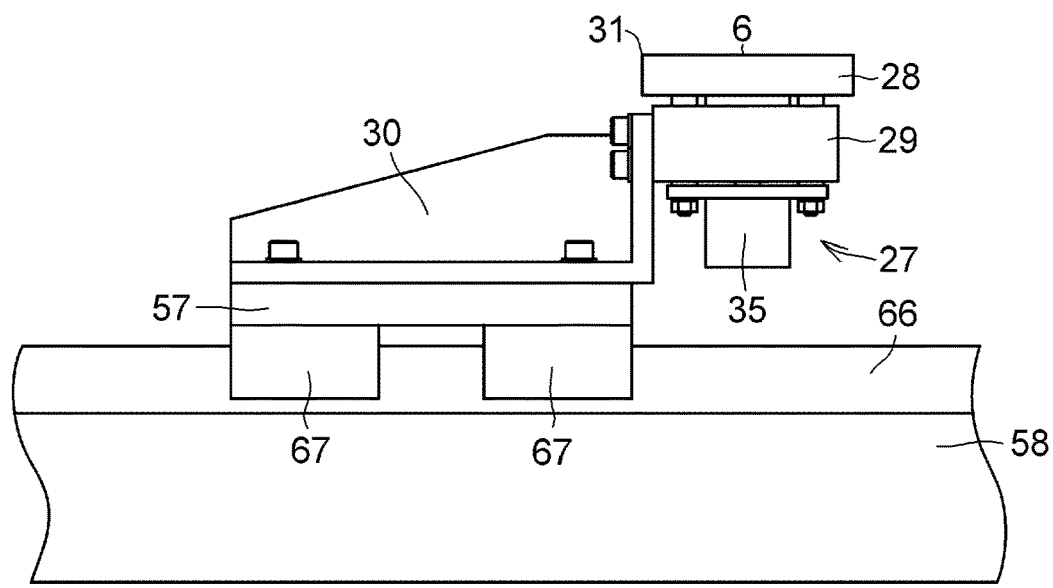
FIG. 9 is a diagram for explaining the operation of the glass plate receiving device in the embodiment shown in FIG. 1.

The flat glass plate receiving surface 6, which has a circular outer contour 31 and extends parallel to the lower surface of the glass plate 2, when not raised or lowered by the raising and lowering means 27, is disposed parallel to the upper surface 51 serving as the supporting surface of the supporting mechanism 15 and an upper surface 52 serving as the supporting surface of the supporting member 4 and at the same height as the upper surface 51 and the upper surface 52. Meanwhile, the glass plate receiving surface 6, when raised by the raising and lowering means 27, is disposed 1 mm to 5 mm higher than the upper surface 51 and the upper surface 52. In addition, as shown in FIG. 9, the glass plate receiving surface 6, when lowered by the raising and lowering means 27, is disposed 1 mm to 5 mm lower than the upper surface 51 and the upper surface 52.

The moving device 8 is constituted by an X-direction moving mechanism 55 and a Y-direction moving mechanism 56.

The X-direction moving mechanism 55 includes: an X-direction linearly moving base 57 on which the base 30 of the glass plate receiving device 7 is mounted; an electric motor 59 attached to a horizontal member 58; a threaded shaft 62 supported rotatably by the horizontal member 58 through bearings 60 and 61; pulleys 63 and 64, which are respectively secured to an output rotating shaft of the electric motor 59 and one end of the threaded shaft 62, as well as a belt 65 trained between the pulleys 63 and 64, so as to transmit the rotation of the output rotating shaft of the electric motor 59 to the threaded shaft 62; a nut (not shown) threadedly engaged with the threaded shaft 62 and secured by being fixed to a lower surface of the linearly moving base 57; a pair of rails 66 formed on the horizontal member 58; and a slider 67 fitted slidably to the pair of rails 66 and secured by being attached to the lower surface of the linearly moving base 57.

The linearly moving base 57 is adapted to move linearly in the X direction while being guided by the pair of rails 66 when the threaded shaft 62 is rotated by means of the pulleys 63 and 64 and the belt 65 as the electric motor 59 is operated to rotate its output rotating shaft.

The Y-direction moving mechanism 56 is constructed in substantially the same way as the X-direction moving mechanism 55, and includes: the horizontal member 58 serving as a Y-direction linearly moving base; a horizontal member 71 fixedly mounted on top of the intermediate base 22 by means of a supporting member 70, the bracket 21, and the like; an electric motor 72 attached to the horizontal member 71; a threaded shaft 75 supported rotatably by the horizontal member 71 through a bearing 73; pulleys 76 and 77, which are respectively secured to an output rotating shaft of the electric motor 72 and one end of the threaded shaft 75, as well as a belt 78 trained between the pulleys 76 and 77, so as to transmit the rotation of the output rotating shaft of the electric motor 72 to the threaded shaft 75; a nut (not shown) threadedly engaged with the threaded shaft 75 and secured by being fixed to a lower surface of the horizontal member 58; a pair of rails 79 formed on the horizontal member 71; and a slider 80 fitted slidably to the pair of rails 79 and secured by being attached to the lower surface of the horizontal member 58.

The horizontal member 58 is adapted to move linearly in the Y direction while being guided by the pair of rails 79 when the threaded shaft 75 is rotated by means of the pulleys 76 and 77 and the belt 78 as the electric motor 72 is operated to rotate its output rotating shaft. In addition, as the horizontal member 58 is moved linearly in the Y direction, the linearly moving base 57 is similarly moved linearly in the Y direction.

The press-breaking device 9 includes: an air cylinder unit 85; a push rod 88 attached to a piston rod 86 of the air cylinder unit 85 and having on its lower surface a circularly flat pressing surface 87 smaller in diameter than the diameter of the circular recess 36; an air cylinder unit 89; a cutter block 93 attached to a piston rod 90 of the air cylinder unit 89 by means of a bearing mechanism 91 and having a cutter wheel 92 at its tip; an electric motor 94; a pulley or gear 95 attached to an output rotating shaft of the electric motor 94; a bearing mechanism 98 attached to a cylinder tube 96 of the air cylinder unit 89 by means of a bracket 97; a pulley or gear 99 attached to the bearing mechanism 98; a timing belt or chain 100 trained between the gear 95 and the gear 99; an engaging member 102 which is attached to the gear 99 and in which a slit 101 is formed; an engaging piece 103 having one end portion disposed in the slit 101 and the other end portion attached to the cutter block 93; and a base 104 on which the air cylinder units 85 and 89 and the electric motor 94 are mounted.

In the press-breaking device 9, as the air cylinder unit 85 is actuated to extend or retract the piston rod 86, the push rod 88 is moved in the vertical direction, i.e., in a Z direction; as the air cylinder unit 89 is actuated to extend or retract the piston rod 90, the cutter wheel 92 is moved in the Z direction; and as the gear 95 is rotated by the operation of the electric motor 94 to rotate the gear 99 by means of the chain 100, both the engaging member 102 and the engaging piece 103 engaging therewith at a slit 101 of the engaging member 102 are rotated about an axis 105 in an R direction. The cutter wheel 92 is similarly rotated about the axis 105 in the R direction by this rotation, and its edge is directed in the direction in which a cut line is formed.

The moving device 10 is constituted by an X-direction moving mechanism 110 and a Y-direction moving mechanism 111.

The X-direction moving mechanism 110 includes: an X-direction linearly moving base 112 on which the base 104 of the press-breaking device 9 is mounted; an electric motor 114 attached to a horizontal member 113; a threaded shaft 117 supported rotatably by the horizontal member 113 through bearings 115 and 116; pulleys 118 and 119, which are respectively secured to an output rotating shaft of the electric motor 114 and one end of the threaded shaft 117, as well as a belt 120 trained between the pulleys 118 and 119, so as to transmit the rotation of the output rotating shaft of the electric motor 114 to the threaded shaft 117; a nut (not shown) threadedly engaged with the threaded shaft 117 and secured by being fixed to a lower surface of the linearly moving base 112; a pair of rails 121 formed on the horizontal member 113; and a slider 122 fitted slidably to the pair of rails 121 and secured by being attached to the lower surface of the linearly moving base 112.

The linearly moving base 112 is adapted to move linearly in the X direction while being guided by the pair of rails 121 when the threaded shaft 117 is rotated by means of the pulleys 118 and 119 and the belt 120 as the electric motor 114 is operated to rotate its output rotating shaft.

The Y-direction moving mechanism 111 is constructed in substantially the same way as the X-direction moving mechanism 110, and includes: the horizontal member 113 serving as a Y-direction linearly moving base; a horizontal member 134 fixedly mounted on an upper frame 132 of the frame 16 by means of a bracket 133 and the like; an electric motor 135 attached to the horizontal member 134; a threaded shaft 136 supported rotatably by the horizontal member 134 through bearings (not shown); pulleys 137 and 138, which are respectively secured to an output rotating shaft of the electric motor 135 and one end of the threaded shaft 136, as well as a belt 139 trained between the pulleys 137 and 138, so as to transmit the rotation of the output rotating shaft of the electric motor 135 to the threaded shaft 136; a nut 140 threadedly engaged with the threaded shaft 136 and secured by being fixed to the upper surface of the horizontal member 113; a pair of rails 141 laid on the horizontal member 134; and a slider (not shown) fitted slidably to the pair of rails 141 and secured by being attached to the upper surface of the horizontal member 113. The horizontal member 113 is suspended from and supported by means of the slider in such a manner as to be movable in the Y direction.

The horizontal member 113 is adapted to move linearly in the Y direction while being guided by the pair of rails 141 when the threaded shaft 136 is rotated by means of the pulleys 137 and 138 and the belt 139 as the electric motor 135 is operated to rotate its output rotating shaft. In addition, as the horizontal member 113 is moved linearly in the Y direction, the linearly moving base 112 is similarly moved linearly in the Y direction.

The carrying-in and carrying-out means 11 includes: a lifting mechanism 151 for lifting up the glass plate 2 which is placed on the belt 3 and for which bend-breaking has been completed, and for clamping the glass plate 2, which is placed on the belt 3, in cooperation with the supporting mechanism 15 with the belt 3 interposed therebetween so as to fix the glass plate 2 onto the belt 3 during bend-breaking; a lifting mechanism 152 for placing the glass plate to be bend-broken onto the belt 3; and a reciprocating mechanism 153 for reciprocating the pair of lifting devices 151 and 152 in the Y direction.

The lifting mechanism 151 has an air cylinder unit 156 mounted on a movable base 155 as well as a vacuum suction device 158 attached to a distal end of a piston rod 157 of the air cylinder unit 156. As the air cylinder unit 156 is actuated to extend or retract its piston rod 157 in the Z direction, the vacuum suction device 158 lifts up the glass plate 2 placed on the belt 3, or clamps the glass plate 2, which is placed on the belt 3, in cooperation with the supporting mechanism 15 with the belt 3 interposed therebetween so as to fix the glass plate 2 onto the belt 3.

The lifting mechanism 152 is formed in the same way as the lifting mechanism 151 and has an air cylinder unit 161 mounted on the movable base 155 common to the lifting mechanism 151 as well as a vacuum suction device 163 attached to a distal end of a piston rod 162 of the air cylinder unit 161. As the air cylinder unit 161 is actuated to lower its piston rod 162 in the Z direction, the vacuum suction device 163 places the glass plate 2, which is being sucked, onto the belt 3.

The reciprocating mechanism 153 includes: the movable base 155; an electric motor 166 attached to an upper frame 165 of the frame 16; a threaded shaft 168 supported rotatably by the upper frame 132 of the frame 16 through a bearing 167; pulleys 169 and 170, which are respectively secured to an output rotating shaft of the electric motor 166 and one end of the threaded shaft 168, as well as a belt 171 trained between the pulleys 169 and 170, so as to transmit the rotation of the output rotating shaft of the electric motor 166 to the threaded shaft 168; a nut 172 threadedly engaged with the threaded shaft 168 and secured by being fixed to the upper surface of the movable base 155; a pair of rails 173 formed on the upper frame 132; and a slider 174 fitted slidably to the pair of rails 173 and secured by being attached to the upper surface of the movable base 155.

The movable base 155, which is suspended from and supported by the upper frame 132 movably in the Y direction through the slider 174, is adapted to reciprocate linearly in the Y direction while being guided by the pair of rails 173 when the threaded shaft 168 is rotated by means of the pulleys 169 and 170 and the belt 171 as the electric motor 166 is operated to rotate its output rotating shaft.

As the reciprocating mechanism 153 is operated, the carrying-in and carrying-out means 11 causes the lifting devices 151 and 152 to reciprocate linearly in the Y direction. In this linear reciprocating motion, the lifting device 152 lifts up the glass plate 2 to be subjected to bend-breaking and placed on a conveying device 181 on the entrance side, carries it into the region 5 surrounded by the supporting member 4, and places it on the upper surface of the upper side portion of the endless belt 3, whereas the lifting device 151 carries the glass plate 2, subjected to bend-breaking and placed on the upper surface of the upper side portion of the endless belt 3, out of the region 5 surrounded by the supporting member 4, and places it on a conveying device 182 on the exit side.

The tension imparting means 12 has a pair of air cylinder units 185 and 186 supported by the bracket 21, and the piston rod of the air cylinder unit 185 rotatably supports the freely rotating drum 19, while the piston rod of the air cylinder unit 186 rotatably supports the freely rotating drum 20.

The tension imparting means 12 imparts tension to the endless belt 3 by means of the freely rotating drums 19 and 20 through the pneumatic resiliency of the air cylinder units 185 and 186, thereby tensioning the endless belt 3. The tension imparting means 12 may not be provided if the endless belt 3 can be tensioned as desired by the positional adjustment of the driving drum 17, the driven drum 18, and the freely rotating drums 19 and 20.

The traveling device 13 includes an electric motor 191 mounted on the base 23; the driving drum 17 and driven drum 18; the freely rotating drums 19 and 20; and pulleys 192 and 193, which are respectively secured to an output rotating shaft of the electric motor 191 and a rotating shaft of the driving drum 17, as well as a belt 194 trained between the pulleys 192 and 193, so as to transmit the rotation of the output rotating shaft of the electric motor 191 to the rotating shaft of the driving drum 17. The driving drum 17 and the driven drum 18 are respectively attached rotatably to frames 195 and 196 which are supported by the intermediate base 22.

As the electric motor 191 is operated to rotate its output rotating shaft, the traveling device 13 rotates the driving drum 17 by means of the pulley 192, the belt 194, and the pulley 193. As the driving drum 17 is rotated, the belt 3 is made to travel in, for example, the A direction, thereby allowing the belt 3 to convey cullet, obtained by bend-breaking on the belt 3, in the A direction and discharge the same.

The supporting mechanism 15 has a rectangular receiving plate 201 and a column 202 for supporting the receiving plate 201, and the column 202 is supported by the bracket 21 through a horizontal member 203.

The supporting mechanism 15 supports from below the glass plate 2, which is placed on the endless belt 3, through the endless belt 3 on the upper surface 51 of the receiving plate 201, and clamps the glass plate 2 in cooperation with the vacuum suction device 158 so as to fix it onto the belt 3.

The conveying device 181 on the entrance side has an endless belt 211 on which the glass plate 2 to be bend-broken is placed, as well as a traveling device (not shown) for causing the endless belt 211 to travel. The conveying device 181 accurately carries in the glass plate 2 to be bend-broken to a predetermined position through the traveling of the endless belt 211 based on the operation of the traveling device.

The conveying device 182 on the exit side has an endless belt 212 on which the glass plate 2 subjected to bend-breaking is placed, as well as a traveling device (not shown) for causing the endless belt 212 to travel. The conveying device 182 conveys the glass plate 2 subjected to bend-breaking, to an ensuing working process, e.g., a process for grinding and polishing bent-broken edges, through the traveling of the endless belt 212 based on the operation of the traveling device.

The glass plate bend-breaking machine 1 further comprises a controller including a microcomputer and the like, and the controller controls the operation of the electric motors, the air cylinder units, the vacuum suction devices, and the like through numerical control commands programmed in advance. Since such a controller itself is publicly known, and a detailed description thereof will be omitted.

The glass plate bend-breaking machine 1 performs the bend-breaking operation with respect to the glass plate 2 in the following manner.

First, the glass plate 2, on which the predetermined bend-breaking lines (main cut lines) 221 have been scored thereon in advance as cut lines, is disposed in an accurate position on the endless belt 3 by the endless belt 211. Incidentally, such predetermined bend-breaking lines 221 may be formed by the glass plate bend-breaking machine 1 of this embodiment.

Upon completion of one bend-breaking, the respective vacuum suction devices 158 and 163 which have already been lowered by the actuation of the air cylinder units 156 and 161 are operated, and the already bend-broken glass plate 2 on the endless belt 3 is sucked by the vacuum suction device 158, while the glass plate 2 which is to be bend-broken next and placed on the endless belt 211 is sucked by the vacuum suction device 163. Subsequently, the air cylinder units 156 and 161 are operated, and the already bend-broken glass plate 2 on the endless belt 3 is lifted up by the vacuum suction device 158, while the glass plate 2 which is to be bend-broken and placed on the endless belt 211 is lifted up by the vacuum suction device 163.

After lifting up, the electric motor 166 of the reciprocating mechanism 153 is operated to reciprocate the movable base 155, and the already bend-broken glass plate 2 lifted up by the vacuum suction device 158 is carried onto the endless belt 212 out of the region 5 surrounded by the supporting member 4, while the glass plate 2 which is to be bend-broken from now and lifted up by the vacuum suction device 163 is carried onto the endless belt 3 and into the region 5 surrounded by the supporting member 4.

During this carrying-out and carrying-in operation, when the electric motor 191 is operated to cause the endless belt 3 to travel in the A direction in the state in which the glass plate 2 is lifted up, the bent-broken cullet remaining on the upper side portion of the endless belt 3 is conveyed in the A direction in conjunction with the traveling of the endless belt 3, and is discharged. After the discharge of the bend-broken cullet, the operation of the electric motor 191 is stopped to stop the traveling of the endless belt 3 in the A direction.

After carrying-in and carrying-out, the air cylinder units 156 and 161 are actuated again to lower the vacuum suction devices 158 and 163. After the vacuum suction devices 158 and 163 are lowered to predetermined positions, the sucking operation of the vacuum suction devices 158 and 163 is stopped, and the bent-broken glass plate 2 is placed on the endless belt 212 by the vacuum suction device 158, while the glass plate 2 to be bend-broken from now is placed on the endless belt 3 by the vacuum suction device 163. Subsequently, the air cylinder units 156 and 161 are reversely actuated to raise the vacuum suction devices 158 and 163. Further, the electric motor 166 of the reciprocating mechanism 153 is reversely operated to cause the movable base 155 to undergo returning motion, and the vacuum suction device 163 is moved to above the endless belt 211, while the vacuum suction device 158 is moved to above the endless belt 3.

During the reciprocating motion of the vacuum suction devices 158 and 163, the glass plate 2 to be bend-broken next is carried in to the predetermined position by the operation of the endless belt 211.

Upon return of the vacuum suction devices 158 and 163 to their original positions, the air cylinder units 156 and 161 are actuated again to lower the vacuum suction devices 158 and 163. After the vacuum suction devices 158 and 163 are lowered to their predetermined positions, the glass plate 2 placed on the upper side portion of the endless belt 3 by the vacuum suction device 158 is pressed against the endless belt 3 by means of the pneumatic resiliency based on the air cylinder unit 156, while the glass plate 2 placed on the endless belt 211 by the vacuum suction device 163 is pressed against the endless belt 211 by means of the pneumatic resiliency based on the air cylinder unit 161.

As a result, the glass plate 2 placed on the upper side portion of the endless belt 3 is clamped at its central portion by the vacuum suction device 158 and the receiving plate 201 with the endless belt 3 interposed therebetween, and is securely held and fixed on the upper side portion of the endless belt 3.

Subsequently, the electric motors 59 and 59a as well as 72 and 72a are operated to move the glass plate receiving devices 7 and 7a in the X and Y directions, so that the glass receiving surfaces 6 and 6a will be disposed below the cutter wheels 92 and 92a. At the same time, the electric motors 114 and 114a as well as 135 and 135a are operated to move the press-breaking devices 9 and 9a in the X and Y directions, so that the cutter wheels 92 and 92a are moved in the radial direction with the predetermined bend-breaking lines 221 set as starting points. When the cutter wheels 92 and 92a are moved from the predetermined bend-breaking lines 221, the air cylinder units 89 and 89a are concurrently actuated to cause the cutter wheels 92 and 92a to abut against the glass plate 2, thereby forming the end cut lines (auxiliary cut lines) 222 as cut lines on the glass plate 2 by means of the cutter wheels 92 and 92a.

During the formation of the end cut lines 222, the electric motors 94 and 94a are operated to cause the edges of the cutter wheels 92 and 92a to be directed in the direction in which the end cut lines are formed. In addition, during the formation of the end cut lines, the push rods 88 and 88a remain raised without coming into contact with the glass plate 2.

After one end cut line 222 is thus formed, the press-breaking devices 9 and 9a and the glass plate receiving devices 7 and 7a are moved to ensuing end-cut-line forming positions, and the cutter wheels 92 and 92a respectively effect the end-cut-line formation within the region 5. During the end-cut-line formation, the glass plate receiving devices 7 and 7a are moved in correspondence with the movement of the cutter wheels 92 and 92a so that the glass plate receiving surfaces 6 and 6a receive the pressing force of the cutter wheels 92 and 92a through the glass plate 2 and the belt 3.

Upon completion of the end-cut-line formation, the air cylinder units 89 and 89a are then actuated to raise the cutter wheels 92 and 92a, thereby canceling the contact between the cutter wheels 92 and 92a and the glass plate 2.

Figure 8:
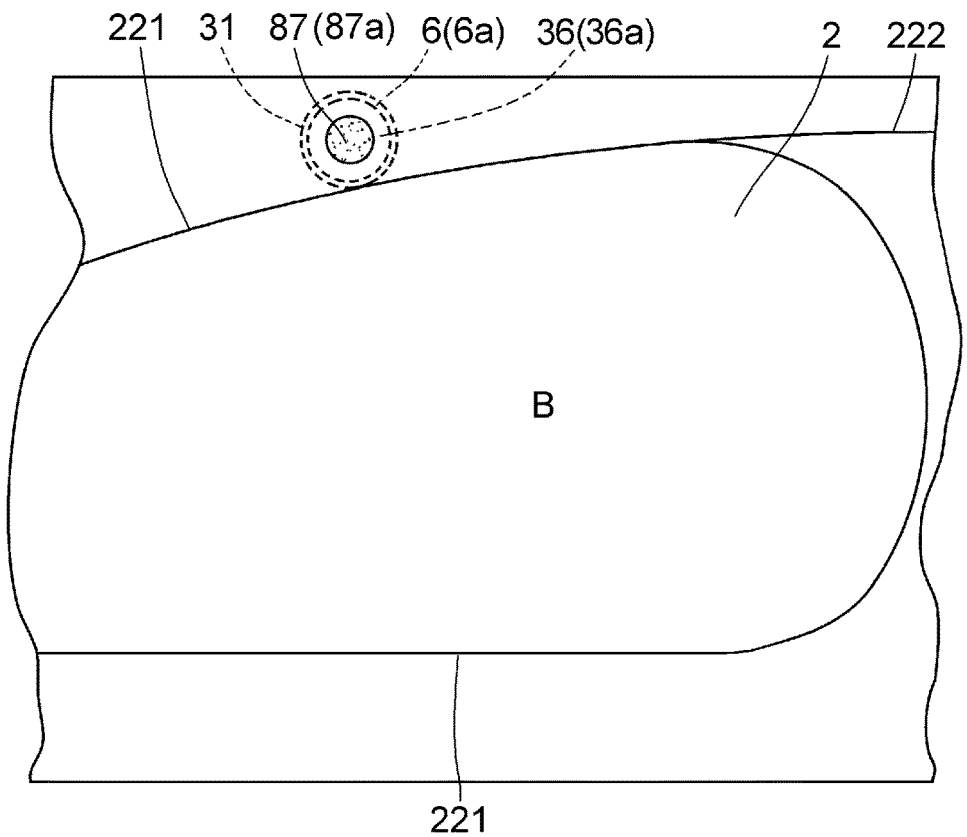
FIG. 8 is a diagram for explaining the operation in the embodiment shown in FIG. 1.

Further, the electric motors 59 and 59a as well as 72 and 72a are operated to move the glass plate receiving devices 7 and 7a in the X and Y directions, such that, as shown in FIG. 8, each of the glass plate receiving surfaces 6 and 6a is disposed at such a position that it is outside a region B surrounded in a plan view by the predetermined bend-breaking lines 221, i.e., the cut lines on the glass plate 2, and that the circular outer contour 31 of each of the glass plate receiving surfaces 6 and 6a circumscribes the predetermined bend-breaking line 221 on the glass plate 2, and such that each of the pressing surfaces 87 and 87a can press that part of the glass plate 2 that opposes each of the recesses 36 and 36a. Similarly, the electric motors 114 and 114a as well as 135 and 135a are operated to move the respective pressing surfaces 87 and 87a of the press-breaking devices 9 and 9a in the X and Y directions, such that each of the pressing surfaces 87 and 87a of the push rods 88 and 88a can press that part of the glass plate 2 that is outside the region B surrounded in a plan view by the predetermined bend-breaking lines 221 and is opposed to each of the recesses 36 and 36a respectively surrounded by the glass plate receiving surfaces 6 and 6a moved by the electric motors 59 and 59a as well as 72 and 72a, thereby allowing each of the pressing surfaces 87 and 87a to be disposed above a central portion of each of the recesses 36 and 36a.

In a state in which the recesses 36 and 36a and the pressing surfaces 87 and 87a are respectively opposed to each other in the Z direction as shown in FIG. 8, and in a state in which the glass plate receiving surfaces 6 and 6a are disposed at the same height as the upper surface 51 as the supporting surface of the supporting mechanism 15 and the upper surface 52 as the supporting surface of the supporting member 4 by the raising and lowering means 27, the air cylinder units 85 and 85a are actuated to lower the push rods 88 and 88a and move, i.e., lower, the pressing surfaces 87 and 87a so as to cause the pressing surfaces 87 and 87a to press those areas that are outside the region B and surrounded by the glass plate receiving surfaces 6 and 6a in a plan view, i.e., those parts of the glass plate 2 corresponding to the respective central portions of the recesses 36 and 36a, thereby allowing a deflection to occur in the glass plate 2 as those parts of the glass plate 2 corresponding to the respective central portions of the recesses 36 and 36a are pressed by the pressing surfaces 87 and 87a. The glass plate 2 is hence press-broken along the predetermined bend-breaking line 221 by this deflection to press-break that part of the glass plate 2 located outside the region B and between the end cut lines 222 out of the glass plate 2 inside the region B. The pressing surfaces 87 and 87a are returned to their original positions by the raising of the push rods 88 and 88a after the press-breaking, and the glass plate 2 outside the region B is discharged as bend-broken cullet by the traveling in the A direction of the endless belt 3. The foregoing operation is effected with respect to the respective predetermined pressing areas between the end cut lines 222.

When the above-described press-breaking is finished, and the glass plate 2 bend-broken along the predetermined bend-breaking lines 221 is obtained, the foregoing operation is repeated.

The bend-breaking machine 1 for bend-breaking the glass plate 2 is comprised of: the endless belt 3 on which the glass plate 2 with the predetermined bend-breaking lines 221 and the end cut lines 222 formed thereon is placed; the supporting mechanism 15 having the upper surface 51 for supporting the glass plate 2 from a lower side of the glass plate 2 inside the region B in a plan view, i.e., in this embodiment a central portion thereof, through the endless belt 3; the glass plate receiving devices 7 and 7a which are disposed below the endless belt 3 and respectively have the glass plate receiving surfaces 6 and 6a for receiving the glass plate 2 from the underside of the glass plate 2 through the endless belt 3 and the recesses 36 and 36a surrounded by the glass plate receiving surfaces 6 and 6a; the moving devices 8 and 8a for respectively moving the glass plate receiving surfaces 6 and 6a of the glass plate receiving devices 7 and 7a; the press-breaking devices 9 and 9a which are disposed above the endless belt 3 and respectively have the pressing surfaces 87 and 87a for press-breaking along the predetermined bend-breaking lines 221 and the end cut lines 222 the glass plate 2 with the predetermined bend-breaking lines 221 and the end cut lines 222 formed thereon; and the moving devices 10 and 10a for respectively moving pressing surfaces 87 and 87a of the press-breaking devices 9 and 9a. Each of the moving devices 8 and 8a is adapted to dispose each of the glass plate receiving surfaces 6 and 6a such that, at the time of the press-breaking of the glass plate 2 by the pressing surfaces 87 and 87a, each of the pressing surfaces 87 and 87a can press that part of the glass plate 2 that is outside the region B of the glass plate 2 surrounded in a plan view by the predetermined bend-breaking lines 221 and is opposed to each of the recesses 36 and 36a respectively surrounded by the glass plate receiving surfaces 6 and 6a. Each of the moving devices 10 and 10a is adapted to dispose each of the pressing surfaces 87 and 87a such that, at the time of the press-breaking of the glass plate 2 by the pressing surfaces 87 and 87a, each of the pressing surfaces 87 and 87a can press that part of the glass plate 2 that is outside the region B of the glass plate 2 surrounded in a plan view by the predetermined bend-breaking lines 221 and is opposed to each of the recesses 36 and 36a respectively surrounded by the glass plate receiving surfaces 6 and 6a respectively moved by the moving devices 8 and 8a. Each of the press-breaking devices 9 and 9a is adapted to press-break the glass plate 2 along the predetermined bend-breaking lines 221 and the end cut lines 222 by pressing each of the pressing surfaces 87 and 87a against that part of the glass plate 2 that opposes each of the recesses 36 and 36a surrounded by each of the glass plate receiving surfaces 6 and 6a. In such a bend-breaking machine 1 for bend-breaking the glass plate 2, at the time of the press-breaking of the glass plate 2 by each of the pressing surfaces 87 and 87a, even if each of the glass plate receiving surfaces 6 and 6a is disposed outside the region B in a plan view and contiguously to the region B, bend-breaking can be caused in the glass plate 2 at the predetermined bend-breaking lines 221 and the end cut lines 222 owing to the deflection of the glass plate 2 in the recesses 36 and 36a. Hence, it is possible to avoid collision between the bend-broken cullet outside the region B and the bend-broken face of the glass plate 2 in the region B and eliminate the occurrence of chips or the like at the bend-broken face of the glass plate 2 as a product after press-breaking.

It should be noted that, in addition to the end-cut-line formation, the predetermined bend-breaking line 221 may be formed by the press-breaking devices 9 and 9a of the glass plate bend-breaking machine 1. In addition, with the glass plate bend-breaking machine 1, press-breaking alone may be effected, and the end-cut-line formation may be effected in a preceding process, in which case the cutter wheels 92 and 92a and the like may be omitted.

Further, although in the above-described embodiment there are provided the pair of glass plate receiving devices 7 and 7a, the pair of moving devices 8 and 8a, the pair of press-breaking devices 9 and 9a, and the pair of moving devices 10 and 10a, and the end-cut-line formation and press-breaking with respect to the glass plate 2 are effected in an apportioned manner, the glass plate bend-breaking machine may be alternatively constructed by being provided with one device, respectively, or by providing three or more devices, respectively.

Figure 10:
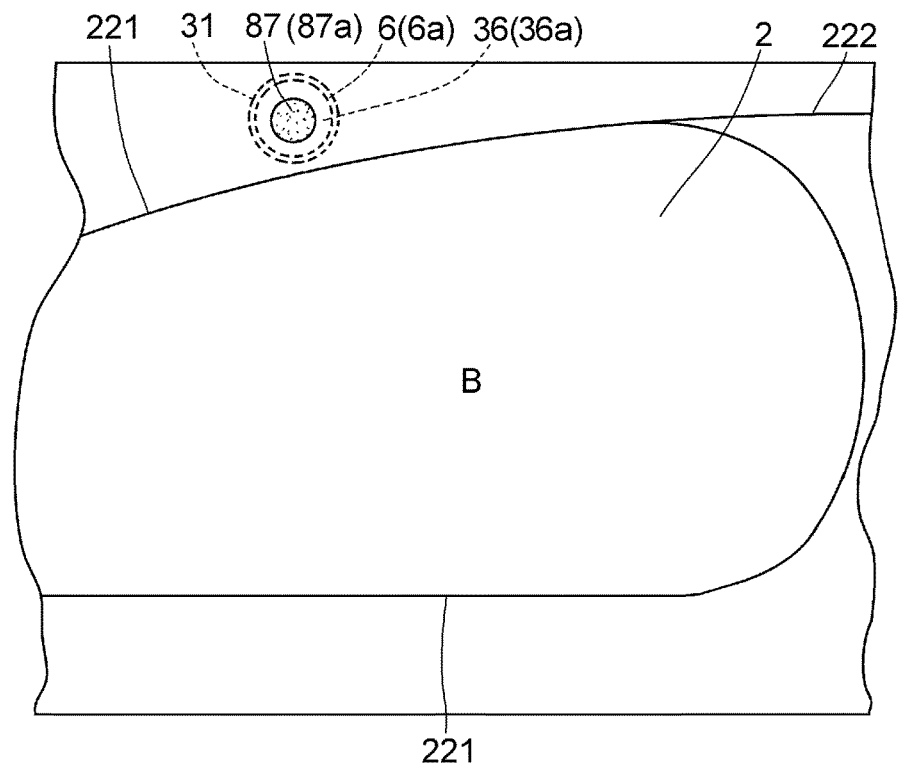
FIG. 10 is a diagram for explaining the operation in the embodiment shown in FIG. 1.
Figure 11:
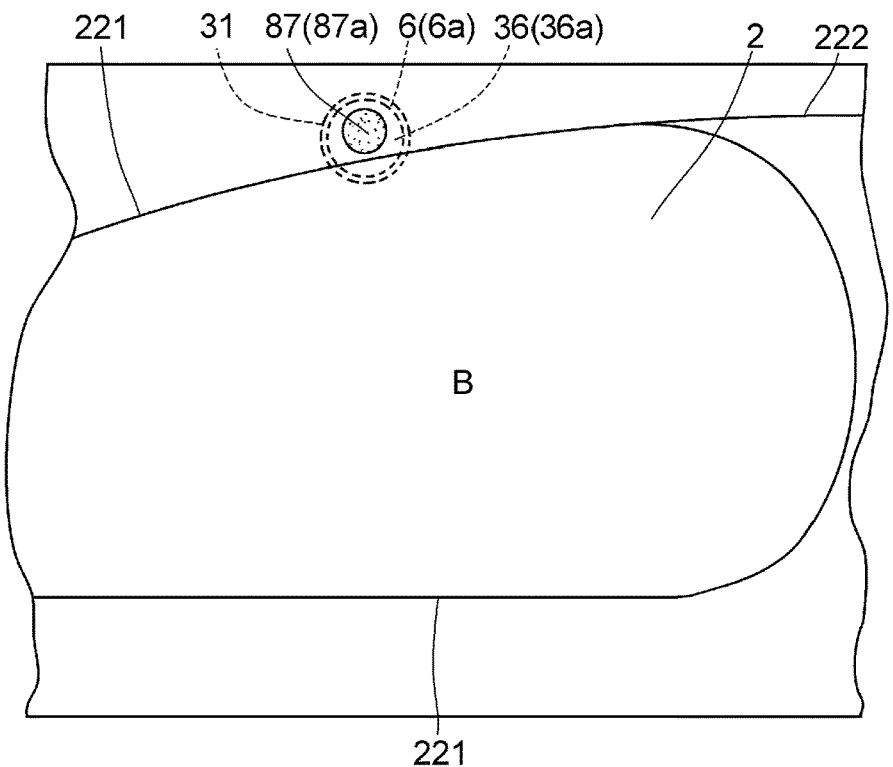
FIG. 11 is a diagram for explaining the operation in the embodiment shown in FIG. 1.

Furthermore, in the above-described embodiment, the electric motors 59 and 59a as well as 72 and 72a are operated to move the glass plate receiving devices 7 and 7a in the X and Y directions, such that, as shown in FIG. 8, the outer contour 31 circumscribes the predetermined bend-breaking line 221 on the glass plate 2 in a plan view. Similarly, the electric motors 114 and 114a as well as 135 and 135a are operated to move the press-breaking devices 9 and 9a in the X and Y directions, such that each of the pressing surfaces 87 and 87a of the push rods 88 and 88a is disposed above each of the central portions of the recesses 36 and 36a outside the region B in a plan view. Alternatively, however, bend-breaking may be executed as follows: The electric motors 59 and 59a as well as 72 and 72a are operated to move the glass plate receiving devices 7 and 7a in the X and Y directions, such that, as shown in FIG. 10, the circular outer contour 31 is moved away from the predetermined bend-breaking line 221 on the glass plate 2 outside the region B in a plan view and the glass plate receiving surfaces 6 and 6a and the recesses 36 and 36a are located outside the region B similarly in a plan view, or such that, as shown in FIG. 11, the outer contour 31 and the glass plate receiving surfaces 6 and 6a intersect the predetermined bend-breaking line 221 on the glass plate 2 in a plan view and that the glass plate receiving surfaces 6 and 6a and the recesses 36 and 36a are partially positioned inside the region B while remaining portions thereof are located outside the region B in a plan view, and such that the glass plate receiving surfaces 6 and 6a are located outside the region B and away from the respective central portions of the recesses 36 and 36a in a plan view. Similarly, the electric motors 114 and 114a as well as 135 and 135a are operated to move the press-breaking devices 9 and 9a in the X and Y directions, so as to allow each of the pressing surfaces 87 and 87a of the push rods 88 and 88a to be positioned above each of the recesses 36 and 36a.

In addition, although, in the above-described embodiment, each of the glass plate receiving surfaces 6 and 6a is raised and lowered by each of the raising and lowering means 27 and 27a, the raising and lowering means 27 and 27a may not be provided, and the glass plate receiving surfaces 6 and 6a may be constantly disposed flush with the upper surface 51.

Figure 12:
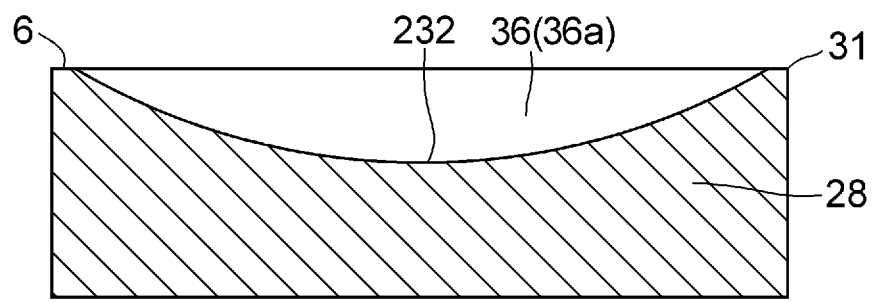
FIG. 12 is an explanatory cross-sectional view of a modification of the glass plate receiving member in the embodiment shown in FIG. 1.

In addition, each of the recesses 36 and 36a may be a partial spherical recess defined by a partial concave spherical surface 232, as shown in FIG. 12.

Figure 7:
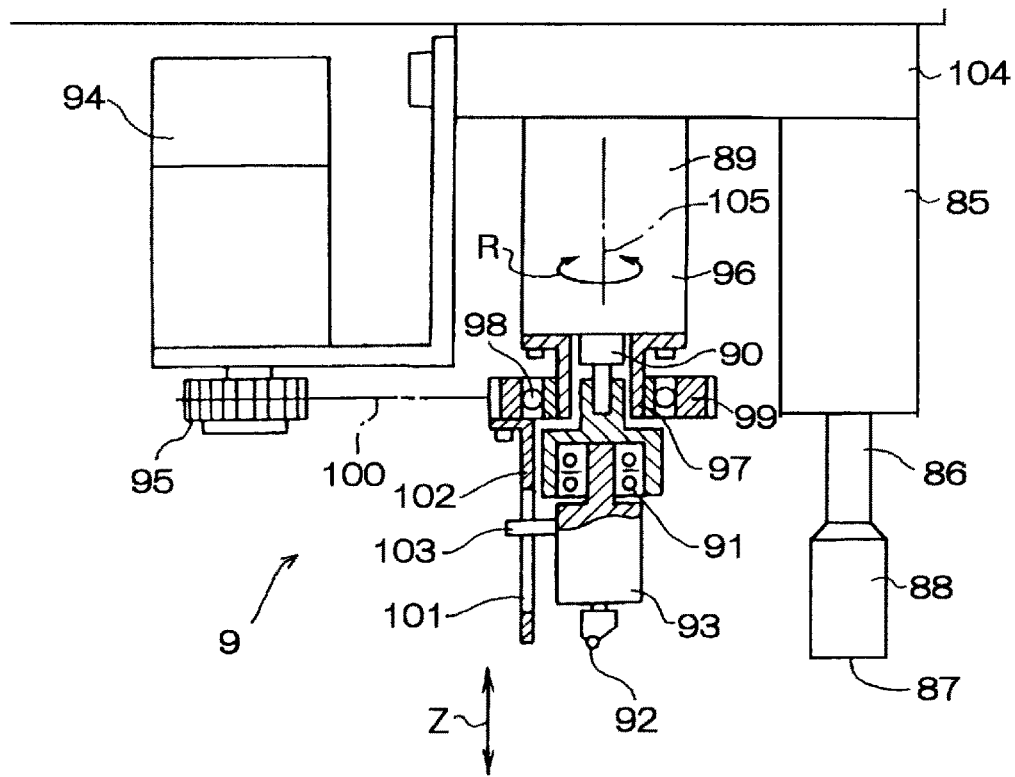
FIG. 7 is a detailed side elevational view of a press-breaking device in the embodiment shown in FIG. 1.
Figure 13:
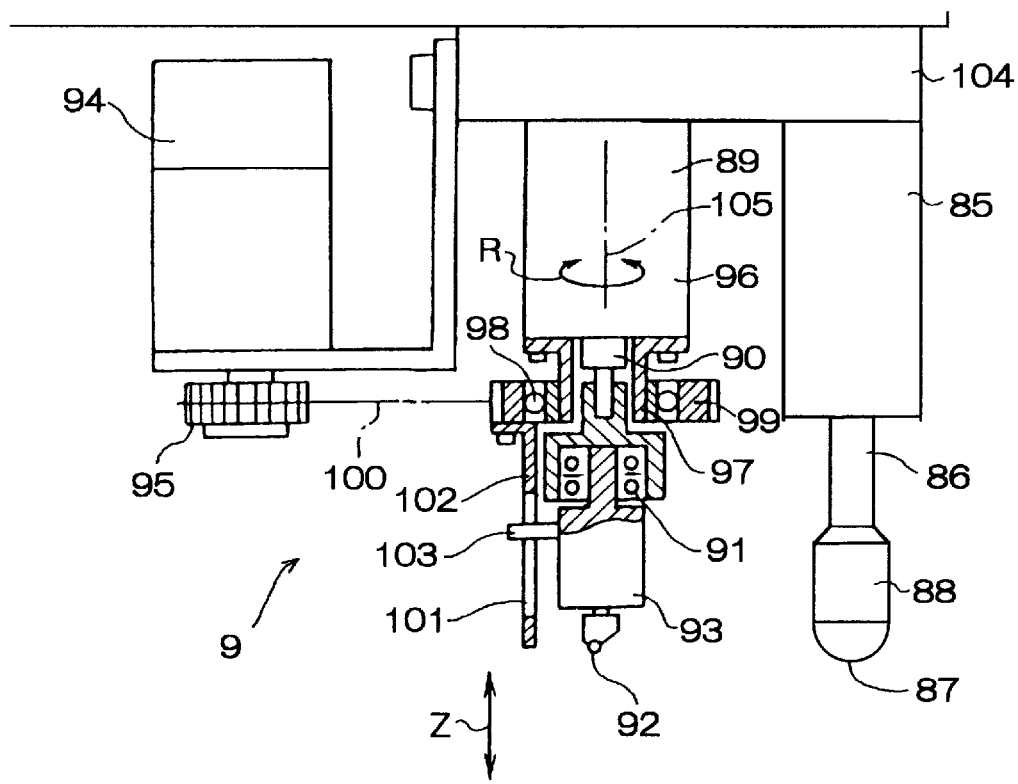
FIG. 13 is an explanatory diagram of a modification of a pressing surface in the embodiment shown in FIG. 1.
Figure 14:
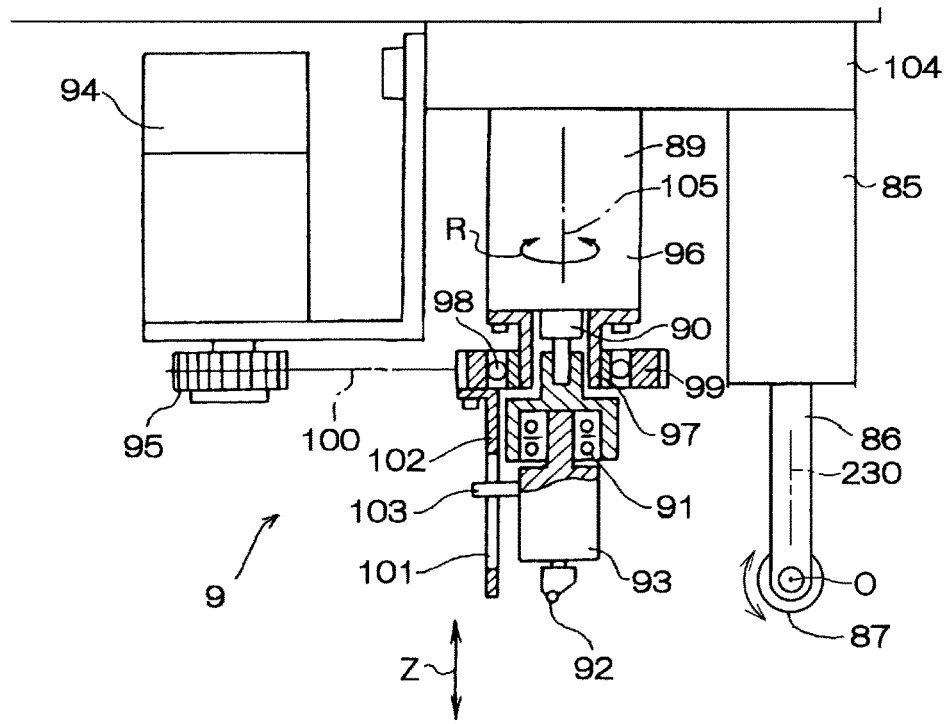
FIG. 14 is an explanatory diagram of another modification of the pressing surface in the embodiment shown in FIG. 1.

In the above-described embodiment, the pressing surface 87 is a flat circular planar surface, as shown in FIG. 7. However, the pressing surface 87 may be a partial spherical surface which does not rotate (fixed partial spherical surface) constituted by an outer peripheral surface of a partial sphere fixed to a lower end of the push rod 88, as shown in FIG. 13, or may be a rotatable cylindrical surface constituted by an outer peripheral surface of a cylindrical body such as a roller which is rotatably supported by the lower end of the piston rod 86 through a shaft, as shown in FIG. 14. Although not shown, the pressing surface 87 may be a rotatable spherical surface constituted by an outer peripheral surface of a spherical body which is rotatably supported by the lower end of the push rod 88. Although also not shown, the pressing surface 87 may be a cylindrical surface, a conical surface, or a truncated conical surface constituted by an outer peripheral surface of a cylindrical body, a conical body, or a truncated conical body fixed to the lower end of the push rod 88. Additionally, the pressing surface 87 may be, instead of the flat circular planar surface, a flat rectangular planar surface constituted by an outer peripheral surface of a prismatic body fixed to the lower end of the push rod 88. In a case where the pressing surface 87 is a rotatable cylindrical surface or a fixed cylindrical surface, it suffices if a rotating mechanism is provided for rotating the push rod 88 about an axis 230 of the push rod 88 or the axis 105 of the piston rod 90, so that the axis O of each of these cylindrical surfaces extends parallel to a tangent to the predetermined bend-breaking line 221 closest to the position on the upper surface of the glass plate 2 (predetermined pressing position) which is pressed by that cylindrical surface.

In the case where the pressing surface 87 has such as a partial spherical surface or cylindrical surface shown in FIG. 13 and FIG. 14, and the recess 36 has a partial spherical recess as shown in FIG. 12, that partial spherical surface or cylindrical surface may have a smaller radius of curvature than the radius of curvature of such a partial spherical recess.

Figure 15:
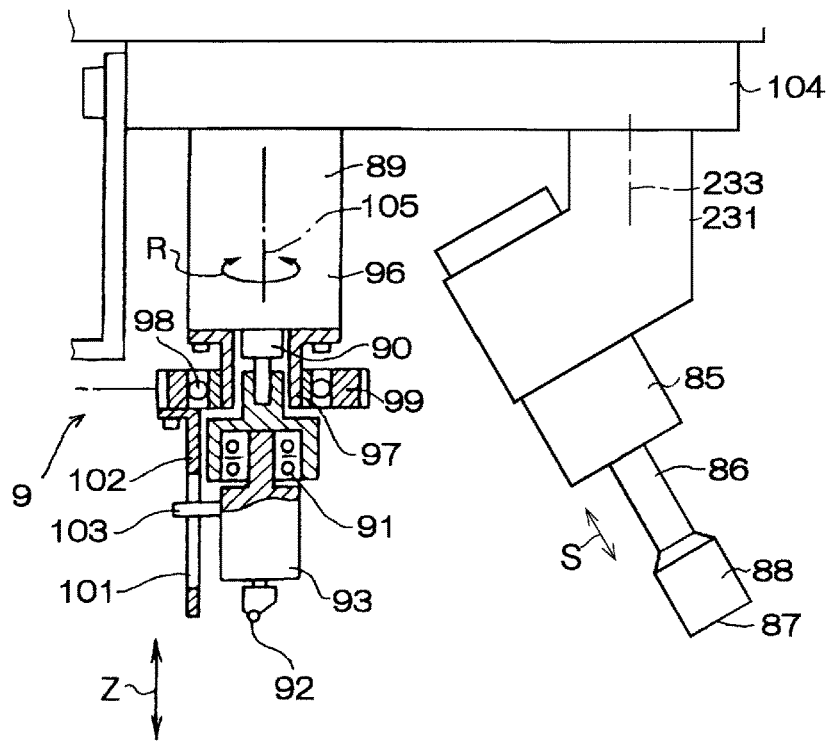
FIG. 15 is an explanatory diagram of a modification of the press-breaking device in the embodiment shown in FIG. 1.

In the above-described embodiment, the pressing surface 87 is abutted against the glass plate 2 by moving the push rod 88 in the Z direction through the extension and contraction of the piston rod 86, to thereby press-break the glass plate 2. Alternatively, however, as shown in FIG. 15, the push rod 88 may be advanced or retreated in an oblique direction S intersecting the Z direction through the extension and contraction of the piston rod 86 of the air cylinder unit 85 provided by being suspended from the base 104 through a suspending member 231, whereby the pressing surface 87 is abutted against the glass plate 2 through the extension of the piston rod 86, so as to press the glass plate 2 obliquely downward by the pressing surface 87 in such a manner as to kick out the glass plate 2 located outside the region B away from the glass plate 2 located inside the region B toward an outer edge of the glass plate 2, thereby press-breaking the glass plate 2. In this case as well, a rotating mechanism may be provided for rotating the air cylinder unit 85 about an axis 233 of the suspending member 231 or the axis 105 of the piston rod 90.

DESCRIPTION OF REFERENCE NUMERALS

1: bend-breaking machine
2: glass plate
3: endless belt
4: supporting member
5: region
6, 6a: glass plate receiving surface
7, 7a: glass plate receiving device
8, 8a: moving device
9, 9a: press-breaking device 11: carrying-in and carrying-out means
12: tension imparting means
13: traveling device

The invention claimed is:

1. A machine for bend-breaking a glass plate comprising:
a flexible member on which the glass plate with a cut line formed thereon is placed;
a supporting mechanism for supporting the glass plate from a lower side of the glass plate through said flexible member;
a glass plate receiving device having an annular glass plate receiving surface for receiving the glass plate from the lower side of the glass plate through said flexible member and a recess surrounded by the annular glass plate receiving surface;
a first moving device for moving the glass plate receiving surface of said glass plate receiving device;
a press-breaking device for press-breaking the glass plate along the cut line by pressing the glass plate from an upper side of the glass plate; and
a second moving device for moving said press-breaking device,
wherein said second moving device is adapted to dispose said press-breaking device such that, at the time of press-breaking of the glass plate by said press-breaking device, said press-breaking device can press that part of the glass plate that opposes the recess surrounded by the glass plate receiving surface which is moved by said first moving device, and
said machine further includes a controller programmed to cause said press-breaking device to press-break the glass plate along the cut line by pressing against that part of the glass plate that is outside a region surrounded in plan view by the cut line and opposes the recess surrounded by the glass plate receiving surface.

2. A machine for bend-breaking a glass plate comprising:
a flexible member on which the glass plate with a cut line formed thereon is placed;
a supporting mechanism having a supporting surface for supporting through said flexible member the glass plate at a central portion of a lower surface of the glass plate in a region surrounded by the cut line on the glass plate in a plan view;
a glass plate receiving device disposed below said flexible member and having an annular glass plate receiving surface for receiving the glass plate from a lower side of the glass plate through said flexible member and a recess surrounded by the annular glass plate receiving surface;
a first moving device for moving the glass plate receiving surface of said glass plate receiving device;
a press-breaking device disposed above said flexible member and having a pressing surface for press-breaking along a cut line the glass plate with the cut line formed thereon; and
a second moving device for moving the pressing surface of said press-breaking device,
wherein said first moving device is adapted to dispose the glass plate receiving surface such that, at the time of press-breaking of the glass plate by the pressing surface, the pressing surface of said press-breaking device can press that part of the glass plate that opposes the recess surrounded by the glass plate receiving surface,
said second moving device is adapted to dispose the pressing surface such that, at the time of press-breaking of the glass plate by the pressing surface, the pressing surface can press that part of the glass plate that opposes the recess surrounded by the glass plate receiving surface which has been moved by said first moving device, and
said machine further includes a controller programmed to cause the pressing surface of said press-breaking device to press-break the glass plate along the cut line by causing the pressing surface to press against that part of the glass plate that is outside a region surrounded in plan view by the cut line and opposes the recess surrounded by the glass plate receiving surface.

3. The machine for bend-breaking a glass plate according to claim 2, wherein the annular glass plate receiving surface is positioned on the same plane as that of the supporting surface of said supporting mechanism, below the supporting surface of said supporting mechanism, or above the supporting surface of said supporting mechanism, such that, at the time of press-breaking of the glass plate along the cut line by the pressing surface of said press-breaking device, a deflection is caused in the glass plate between the cut line on the glass plate and that area of the glass plate that has been pressed by the pressing surface.

4. The machine for bend-breaking a glass plate according to claim 2, wherein the glass plate receiving surface is circularly annular, and the recess is defined by a partial concave spherical surface.

5. The machine for bend-breaking a glass plate according to claim 2, wherein said first moving device includes a moving mechanism for moving the glass plate receiving surface in one direction and in another direction intersecting the one direction, within a plane which is parallel to the surface of the glass plate.

6. The machine for bend-breaking a glass plate according to claim 2, wherein said second moving device includes a moving mechanism for moving the pressing surface in one direction and in another direction intersecting the one direction, within a plane which is parallel to the surface of the glass plate.

* * * * *